United States Patent
Junod

(10) Patent No.: US 9,053,300 B2
(45) Date of Patent: Jun. 9, 2015

(54) DEVICE AND A METHOD FOR GENERATING SOFTWARE CODE

(75) Inventor: Pascal Junod, Vufflens-la-Ville (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 412 days.

(21) Appl. No.: 13/109,502

(22) Filed: May 17, 2011

(65) Prior Publication Data

US 2011/0283115 A1  Nov. 17, 2011

(30) Foreign Application Priority Data

May 17, 2010  (EP) .................................. 10162997

(51) Int. Cl.
G06F 11/30  (2006.01)
G06F 21/14  (2013.01)
H04L 9/06  (2006.01)

(52) U.S. Cl.
CPC .............. *G06F 21/14* (2013.01); *H04L 9/0631* (2013.01); *H04L 2209/16* (2013.01)

(58) Field of Classification Search
USPC .................................................. 713/189–191
See application file for complete search history.

(56) References Cited

U.S. PATENT DOCUMENTS

| | | | |
|---|---|---|---|
| 6,490,353 B1 | 12/2002 | Tan | |
| 6,643,775 B1 | 11/2003 | Granger et al. | |
| 2002/0169969 A1* | 11/2002 | Watanabe et al. | ............. 713/190 |
| 2004/0003264 A1* | 1/2004 | Zeman et al. | ................. 713/190 |
| 2005/0050355 A1* | 3/2005 | Graunke | ........................ 713/201 |
| 2006/0031686 A1* | 2/2006 | Atallah et al. | ................. 713/190 |
| 2006/0095764 A1* | 5/2006 | Suanez et al. | ................. 713/168 |
| 2006/0107070 A1* | 5/2006 | Rice et al. | ....................... 713/190 |
| 2008/0107104 A1* | 5/2008 | Olderdissen et al. | ......... 370/389 |
| 2009/0217008 A1* | 8/2009 | Sato et al. | ..................... 712/221 |
| 2011/0087895 A1* | 4/2011 | Olson et al. | .................... 713/190 |

FOREIGN PATENT DOCUMENTS

WO  WO 00/31917  6/2000

OTHER PUBLICATIONS

Li et al., "A Web Page Malicious Code Detect Approach Based on Script Execution," Natural Computation, 2009. ICNC '09. Fifth International Conference on 2009 , pp. 308-312.*

(Continued)

*Primary Examiner* — Christopher Brown
*Assistant Examiner* — Roderick Tolentino
(74) *Attorney, Agent, or Firm* — DLA Piper LLP US

(57) ABSTRACT

A method to generate final software code resistant to reverse engineering analysis from an initial software code, said initial software code transforming an input data to an output data, said final software code being executed by a processor being able to directly handle data of a maximum bit length M, comprising the steps of: building a conversion table comprising in one side one instruction and in the other side a plurality of equivalent instructions or sets of instructions; splitting the input data into a plurality of segments of random length, said segments having a length equal or smaller than the maximum bit length M; for each instruction of a block of instructions, selecting pseudo-randomly an equivalent instruction or set of instructions from the conversion table so as to obtain an equivalent block of instructions; and appending the plurality of equivalent blocks of instructions to obtain the final software code.

12 Claims, 2 Drawing Sheets

(56) References Cited

OTHER PUBLICATIONS

Andersson et al., "A framework for detecting network-based code injection attacks targeting Windows and UNIX," Computer Security Applications Conference, 21st Annual 2005 , pp. 10-58.*
European Search Report issued in EP 10 16 2997, dated Oct. 20, 2010.

Jin Han et al., "A Programmable Security Processor for Cryptography Algorithms", 9th International Conference on Solid-State and Integrated-Circuit Technology, 2008, ICSICT 2008, pp. 2144-2147, Oct. 20, 2008.
Thomas S. Messerges, "Securing the AES Finalists Against Power Analysis Attacks", International Workship on Fast Software Encryption, FSE 2000, LNCS vol. 1978, pp. 150-164, Apr. 1, 2000.

* cited by examiner

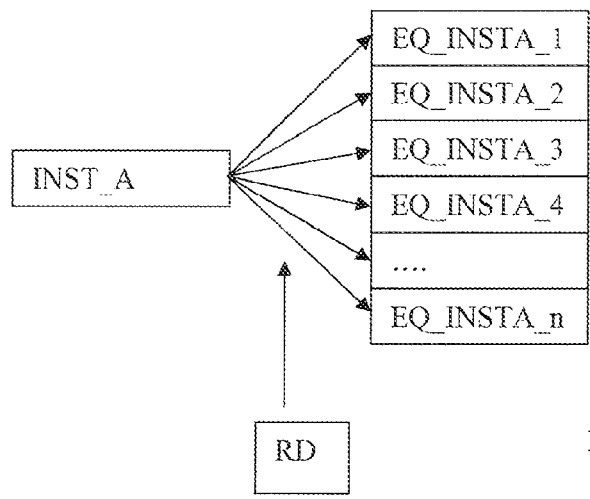

DEVICE AND A METHOD FOR GENERATING SOFTWARE CODE

CROSS-REFERENCE TO RELATED APPLICATIONS

This application claims priority under 35 U.S.C. Section. 119 to European application No. EP 10162997.0, filed May 17, 2010, which is incorporated by reference in its entirety.

FIELD

The present invention relates to the field of obfuscated software, in particular software for the use in encryption and decryption of electronically transmitted information.

STATE OF THE ART

The availability of standard processing platforms with downloaded software eases the comprehension by hackers of the security mechanisms. The program can be executed step-by-step and the inputs, outputs and all intermediate values can be analyzed in detail and/or modified. For example, software cryptography could be attacked by extracting the decryption keys from the RAM using a debugger. The attackers will then be able to use the extracted keys to access the encrypted data without taking into account the access rules attached to these data.

Popular trusted ciphers like RSA and the Advanced Encryption Standard (AES) were not designed to operate in environments where their execution could be observed and/or tampered with. In fact, the standard cryptographic model is that communications endpoints and computing platforms are assumed to be trusted. If the target device resides in a hostile environment, then the cryptographic keys may be directly visible to an attacker. An attacker may be able to monitor the application and extract one or more cryptographic keys embedded or generated by the application. This is a common problem for PCs, set-top boxes and other devices where Digital Rights Management (DRM), Conditional Access Systems (CAS) or other security sensitive applications are involved. Hackers monitor standard cryptographic APIs Or memory and simply grab keys when exposed.

The document WO09/140,774A discloses a development suite for generating files, such as DRM-protected files, using white-box cryptography. The suite consists of a code generation tool, a data transformation engine, and a white-box data generation tool, and a white-box library. In the white-box cryptography context, the data transformation engine is used to protect the boundary between the cryptographic operation and the surrounding code. In particular, the data transformation engine is used to apply data transformations to the inputs to and outputs from the cryptographic operations. If the user specifies that transformations are required via a white-box parameterization file, the code generation tool puts the information specified by the user into a form the data transformation engine understands, namely as qualifiers on data variables and function prototypes. The data transformation engine then applies the specified transformations, and passes information to the data generation tool regarding which transformations were chosen.

The document, WO09/034,504A discloses a system for cryptographic processing of content that comprises an input for receiving the content. A plurality of look-up tables represents a white-box implementation of a combined cryptographic and watermarking operation. The look-up tables represent processing steps of the combined cryptographic combined with watermarking operations; the look-up tables are arranged for being applied according to a predetermined look-up scheme. The look-up scheme prescribes that an output of a first look-up table of the plurality of look-up tables be used to generate an input of a second look-up table of the plurality of look-up tables. The combined cryptographic and watermarking operations comprise a cryptographic operation and a watermarking operation. A control module looks up values in the plurality of look-up tables in dependence on the received content and in accordance to the look-up scheme, thereby applying the combined cryptographic and watermarking operation to the content.

The document WO08/059,420A discloses a cryptographic method and a white-box implementation thereof. The method comprises applying a plurality of transformations, each replacing an input word by an output word, and applying a diffusion operator to a concatenation of a plurality of the output words for diffusing information represented by the output words among the output words. A key to the cryptographic method comprises information representing the diffusion operator. The diffusion operator satisfies a property that a change of one bit in an input to the diffusion operator corresponds to a change of more than one bit in an output of the diffusion operator.

BRIEF DESCRIPTION OF VARIOUS EMBODIMENTS

All the above proposed solutions are more or less resistant to analysis and it is still a challenge to propose a method to produce software code producing a result without being able to reconstruct the data, flow for an observer.

According to an embodiment of the present invention, a method to generate final software code resistant to reverse engineering analysis from an initial software code, said initial software code executing a function formed by a plurality of blocks of instructions and transforming an input data to an output data, said final software code being executed by a processor being able to directly handle data of a maximum bit length M and having an instructions set, said method comprising the steps of:
  building a conversion table comprising in one side one instruction and in the other side a plurality of equivalent instruction or set of instructions,
  splitting the input data into a plurality of segments of random length, said segments having a length equal or smaller than the processor maximum bit length M,
  for each instruction of a block of instructions, selecting pseudo-randomly an equivalent instruction or set of instructions from the conversion table so as to obtain an equivalent block of instructions,
  appending the plurality of equivalent block of instructions to obtain the final software code.

According to one embodiment, an initial software code is converted into a list of initial instructions, each instruction being executable by the target processing device (e.g., assembly language or machine language instructions). This software code is called the initial code. This conversion is made thanks to a compiler that converts the high level language into executable instructions for the targeted processor.

The second step is the production of a conversion table in the form of equivalent instructions or sets of instructions for each initial instruction. In most of the cases, one initial instruction is equivalent to several instructions of the targeted processor. The size of the produced code is not a concern for the present invention. The third step is to randomly convert the initial code into the final code by replacing all or part of the initial instructions of the initial code by an equivalent instruction or set of instructions.

While the conversion process run, change of stack pointer instructions are detected, such as jumps, or subroutine calls. The jump or call instructions are skipped and the code of the targeted program location is then reproduced at the location following the detection of the jump or call instructions, while replacing each initial instruction by one equivalent from the conversion table. In case of a subroutine, the instruction "return" is not copied into the final code since the code of the subroutine was simply copied and no return should be made.

BRIEF DESCRIPTION OF THE FIGURES

The present invention will be better understood thanks to the attached figures in which:

FIG. 1 illustrates the initial software code

FIG. 2 illustrates the library of equivalent instructions for one initial instruction, FIG. 3 illustrates the final software code.

DETAILED DESCRIPTION

Figure 4:
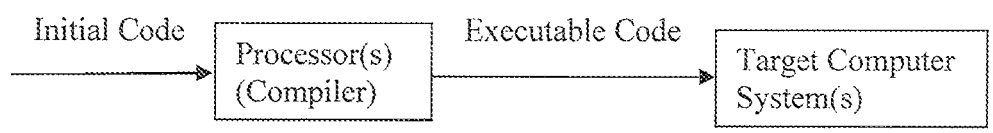
FIG. 4 illustrates a sample computer system for processing software code.

One embodiment of the invention is a conversion process from an initial software code into a final software code, this final, software code having the same functionalities but the size of the final software code is much higher than the initial software code.

The initial software code is represented at the FIG. 1. The first column contains the instruction counter. The second column illustrates the initial instruction, the so-called unitary instruction.

The FIG. 2 shows the table of equivalent instructions. For the instruction INST_A, we have a set of n equivalent instructions, from EQ_INSTA_1 to EQ_INSTA_n. Each EQ_INSTA is a complete equivalent, to the INSTA and for the same input produces the same output.

For each instruction (INST_B ... INST_Z), the library contains a plurality of equivalent instructions sets.

The selection of the equivalent set is made by a pseudo-random generator RD that is used to select one of the equivalent set of instructions from the conversion table. Step by step, the initial code is converted into the final code as illustrated in the FIG. 3. Since an equivalent of one initial instruction can contain 10 or more instructions, the resulting final Software code will have a larger size.

One equivalent instruction can be a table lookup using as input pointer the input value and the content of the location pointed being the output, value. This is the case for example for a rotation operation (ROR A). An operation having two operands (addition, subtraction, exclusive- or etc) can be realized by a lookup table having two dimensions. The first operand being the X axis, the second operand being the Y axis and the location pointed to by the X, Y coordinates is the result.

Additionally, iterations may no longer be executed by re-executing the same software code but by duplicating the software code each time an iteration is requested. For example, in each case of a subroutine call, the initial software code of the subroutine is appended to the previously generated code and the replacement process is executed so that the final code for each instance of the subroutine will be different thanks to the replacement by equivalent instructions randomly selected.

An example of the software code is an encryption algorithm. It is well known that these algorithms are using iterative rounds, each round using a part of the key. According to the present invention, the rounds are unwrapped and the code of each round is added to the previous code. Due to the random selection of the equivalent instructions, the final code of each round will be different even though the same operations are executed. It is then more difficult to know when a round finishes and when a round starts.

Another aspect of the invention is the manipulation of non-standard data length. The processor manipulates data of a predefined bit length M, usually 8, 16 or 32 bits. The input data is split into a plurality of segments of random length, said segments having a length equal or smaller than the processor maximum bit length M. For example, assume the software to be obfuscated against reverse engineering analysis is encryption software using a 128 bit key and targeted for a 32 bit processor. Conventionally, the 128 bit key would be defined as a series of four-32 bit data locations. Instead, the key will be stored in a series of more than four 32 bit data locations, each having a random number (less than 32) of bits of meaningful data. As an example, the least significant 15 bits of the key may be stored in a first 32-bit memory location, the next 10 bits in a second 32-bit memory location, the next 22 bits in a third 32-bit memory location, the next 6 bits in a fourth 32-bit memory location, the next 30 bits in a fifth memory location, and so on such that the entire 128 bit key is stored in, for example, 8 memory locations. These memory locations may or may not be consecutive locations.

This also means that the code that accesses these memory locations must be written to access such data. In other words, if it were desired to move the first 32 bits of the key to register A, then the code would be written to, for example, move the first 15 bits from the first memory location in register A, then move the next 10 bits of the key from the second memory location to register B, then rotate register B to the left 10 places, then OR registers A and B so that the first 25 bits of the key are in register A, then move the next 22 bits of the key from the third memory location into register B, then mask out all but the least significant 7 bits of register. B, then rotate register B 25 times so that the 7 least bits remaining after the masking operation are in the 7 most significant bit positions in register B, then OR, register B with register A again so that all 32 least significant bits of the key are in register A.

As discussed above, it is possible to use the input data splitting technique with or without the equivalent instruction technique. Thus, the initial code might have the key stored in four consecutive locations and a single move instruction to retrieve the least significant 32 bits into register A; and the equivalent code may have the storage split as described above and the single move instruction to register A substituted by the instructions described above, with additional steps of storing the contents of register B in a temporary location at the start of the operation and restoring the contents of register B at the completion of the operation.

Manipulating non-standard data length aims at significantly complicating the analysis of the code, as the access patterns to interesting data will appear less regular to an adversary observing those memory accesses. Furthermore, if two functionally equivalent code portions have different memory access patterns, then it will be more costly for the adversary to recognize that they are functionally equivalent.

This feature can be implemented with a common design of software code without the conversion into equivalent instructions.

According to a particular embodiment, and due to this unwrapped configuration, it is then possible to embed the key into the final code. In encryption algorithms, the initial key is usually divided into several sub-key, each sub-key being applied to a round. The data of the sub-key will then represent constants into the initial code and the final code and these constants will be invisible to the final code due to the replacement by equivalent instructions. For example, the initial code contains an addition operation (ADD #10,A), the equivalent instruction could be a subtraction with the two's complement value (SUBB #F0, A). The process of transforming a first instruction to an equivalent instruction will also impact the constants used.

In case that lookup tables are used, the content of the table is stored generally separately from the final code. These tables are then easy to read and interpret.

According to an embodiment of the invention, these tables are scrambled. By scrambling it is meant a simple mixing with another value or a more complex operation executed by the software code. The scrambling key can be a constant in the software code or a value calculated during the operation of the software code such as a register value resulting of former bit or byte manipulation and is then dynamically generated. When the software code fetch a constant from the table, the result is then transferred into the software code and then descrambled.

In a particular implementation, the input of the table is also scrambled so that when a table is to be used, the input value is first scrambled (or descrambled, it is only a matter of convention) and then passed to the table.

According to an embodiment of the invention, the software code comprises at least one sub-block comprising a plurality of instructions. This sub-block is duplicated in the initial software and then converted in different final software code according to the method of the invention. A comparison step is then added that collects the result of these sub-blocks and compares the result of each sub-block. In case that discrepancies are detected, the software code is routed to an abnormal procedure.

The comparison step can work on a majority basis and pass the result of the majority of sub-blocks to the next sub-block.

Another way to process the various outputs of a sub block, is to execute a calculation using these outputs. The result is then reused to the next sub-block so that when a difference is detected between the sub-blocks, these differences will not lead to a halt of the processing but rather will be spread along the software code so that the final result will be wrong.

Execution of the Generated Code

The present invention further covers a method to execute the final software code as described above, said software code representing a block cipher software code, said block cipher software code transforming an input data of a size N*M to an output data of a size N*M, N being the size of a single block cipher input block, said final software code being executed by a processor being able to directly handle data of a maximum bit length M and having an instructions set, said method comprising the steps of:
dividing the input data into an array of M segments of N bits size,
shuffling the input data array by grouping to a segment of indicia m all bits of the indicia m of the input data array, m varying from 0 to N−1,
Executing the software code on the input data array to produce an output data,
dividing the output data into an array of M segments of N bits size,
de-shuffling the output data by grouping to a segment of indicia m all bits of the indicia m of the output data array, m varying from 0 to N−1.

In one particular embodiment, the block cipher is a AES block cipher:

This solution aims at protecting an implementation of the Advanced. Encryption Standard (AES), but could possibly be applied to any algorithm. In, the sequel, we will assume that we are targeting an implementation running on a CPU with an m-bit word size. The implementation will then encrypt m blocks of data of 128 bits.

The obfuscation process consists of the following steps performed in a sequential way:
1. Orthogonalization of the data (i.e., put all 32 least significant bits of the blocks in a single register, and so on)
2. Evaluation of AES as a completely unwrapped Boolean circuit consisting of single Boolean gates linked together.
3. De-orthogonalization of the data The step 2 can be considerably refined by observing that all components of AES can easily be expressed as Boolean gates, except for the S-box (the SubBytes operation in the AES terminology). Expressing the S-box in Boolean gates is slightly more complicated 1.0 and can for instance be done using a representation relying on operation in sub-fields of GF(256), like GF(16) and GF(4) (the "GF" stands for "Galois Field"). There are large diversification possibilities at that step if one considers various ways to express elements of a given field as a combination of elements of subfields, by playing with different bases or types of bases. Then, once we have a first Boolean circuit in hand, one can reprocess this circuit by re-writing it in terms of a different, complete set of Boolean operators (like using only NAND gates), for instance, hence considerably complexifying its description. Other obfuscation possibilities consists in pre-computing parts of the circuit and putting them in, tables, or randomizing the computation depending on temporary random values, or hard-coding protection mechanisms efficient against side-channel cryptanalysis.

The present method is carried out by a computer system having, the software designed according to the method of the invention. An example of such a computer system is shown in FIG. 4. As used herein, "processor" may refer to a single processor or computer or multiple processors or computers. The initial code is input to a first processor (which may or may not be the same processor that compiles the high order language source code into assembly code) that substitutes the equivalent code for the initial code and, if necessary, performs additional operations (e.g., linking) sufficient to, result in, executable code. The executable code is then input to a target computer system, such as by writing the executable code into a permanent memory in an embedded system or downloading the executable code to a RAM, for execution by the target computer system.

Figure 5:
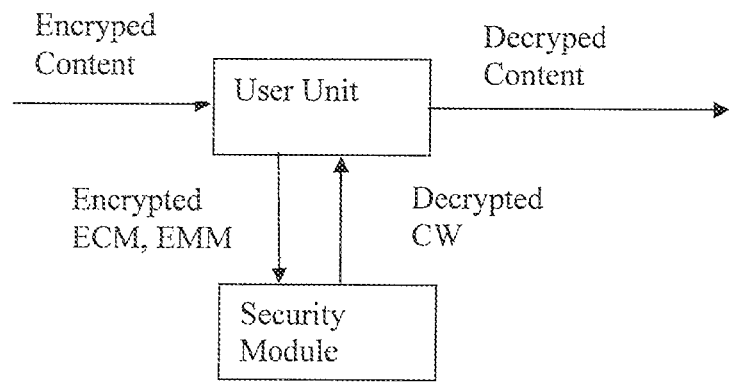
FIG. 5 illustrates a sample decoder for decoding encrypted content.

According to a particular application, the software code generated by the method is executed in a multimedia decoder and is in charge of the security aspects i.e. the rights management. An example of such a decoder is illustrated in FIG. 5, which shows a security module such as a smart card or smart chip (which typically includes one or more processors, memory, and associated interconnections, not shown) connected to user unit such as an integrated receiver/decoder or "set top box" as is common in the pay television industry to decrypt EMMs (entitlement management messages) and ECMs (entitlement control messages) and return decrypted control words in a manner well known in the art and described in various DVB standards known to those of skill in the art and incorporated by reference herein.

As used herein, "random" and "pseudorandom" are used interchangeably to refer to information that appears random to an ordinary observer; such information may or may not be truly random.

The invention claimed is:

1. A method to generate final software code from an initial software code, said initial software code executing a function formed by a plurality of blocks of instructions and transforming an input data to an output data, said final software code being directly executable by a target processor to provide said function, the target processor having an instructions set, the final software code having a size which is larger than a size of the initial software codes, said method comprising the steps of:

building a conversion table to map at least one instruction from the instruction set to a plurality of functionally equivalent instructions or sets of instructions;

for a plurality of instructions from the plurality of blocks of instructions, selecting pseudo-randomly an equivalent instruction or set of instructions from the conversion table so as to obtain an equivalent block of instructions;

from the plurality of blocks of instructions, for each instruction whose execution would involve a non-sequential change of stack pointer, reproducing the instructions at a position indicated by such a change in stack pointer and pseudo-randomly selecting an equivalent instruction or set of instructions from the conversion table so as to obtain a further equivalent block of instructions; and appending a plurality of said equivalent blocks of instructions and further equivalent blocks of instructions to obtain the final software code.

2. The method of claim 1 wherein at least one instruction is implemented as a lookup table.

3. The method of claim 2, wherein the tables are scrambled.

4. The method of claim 2, wherein the input to access the tables are statically scrambled using a randomly generated permutation.

5. The method of claim 1 wherein an instruction is implemented as a computation of a Boolean circuit.

6. The method of claim 1 wherein part of the initial software code comprises at least one sub-block, said sub-block being replicated at least two times, each replication having the same functionalities with different embodiments, said sub-block having at least a first and second function executed sequentially, each having an input and an output, the output of a first function in the first sub-block is connected to the input of the second function in the second sub-block, the output of the first function in the second sub-block is connected the input of the second function in the first sub-block.

7. The method of claim 6, wherein an erroneous output is used forward in the computation of the whole software code with the goal of diffusing the errors.

8. The method of claim 6, wherein a different implementation of the sub-block is statically chosen for the plurality of executions.

9. The method of claim 6, wherein a different implementation of the sub-blocks are dynamically chosen for the plurality of executions.

10. The method of claim 1, wherein part of the initial software code comprises at least one sub-block, said sub-block being replicated at least two times, each replication having the same functionalities with different embodiments, comprising the steps of adding comparison codes and to connect the output of each sub-block with the comparison code, said code producing a result according to a similarity of the inputs.

11. The method of claim 1, wherein part of the initial software code comprises at least one sub-block, said sub-block being replicated at least three times, each replication having the same functionalities with different embodiments, comprising the steps of adding comparison code and to connect the output of each sub-block with the comparison code, said code producing a result according to the similarity of the inputs.

12. The method according to claim 1, further comprising:
splitting the input data into a plurality of segments of random length, said segments having a length equal to or smaller than the processor maximum bit length M.

* * * * *